Aug. 23, 1966 S. J. SZERSZEN 3,268,281

WALL TELEPHONE DIRECTORY AND NOTATION HOLDER

Filed Dec. 14, 1964

INVENTOR.

Stanley J. Szerszen

BY

John J. Kowalik

Atty.

3,268,281

WALL TELEPHONE DIRECTORY AND NOTATION HOLDER

Stanley J. Szerszen, 4344 N. Nordica Ave., Norridge, Ill.

Filed Dec. 14, 1964, Ser. No. 418,069
10 Claims. (Cl. 312—198)

This invention concerns the provision of a novel holder for telephone numbers and other information in association with a wall telephone.

As will be readily apparent, it is usually a nuisance to store pads of paper and writing implements close to a wall telephone. Frequently this is unsightly and the paper and pencils become misplaced so that they are not available when needed.

It is a general object of this invention to provide a novel enclosure or holder for such supplies in a compact and aesthetic structure in association with a wall telephone.

A further object is to provide a novel holder which may be directly mounted upon a typical wall telephone instrument without in any way impairing its function or destroying its aesthetic qualities.

A more specific object is to provide a novel holder incorporating a saddle portion adapted to fit over the telephone and having a pair of hollow door structures carried from the saddle portion in flanking relation to the telephone and in effect forming lateral extensions thereof and enclosing writing pads and instruments in addition to a selective directory.

Another object is to devise a wall telephone directory incorporating a mounting structure and a pair of enclosures flanking the telephone housing, the enclosures being biased into open position away from the telephone housing or into embracing relation with the housing.

These and other objects and advantages inherent in and encompassed by the invention will become more readily apparent from the specifications and the drawings, wherein.

Figures 1, 2, 3, 4:
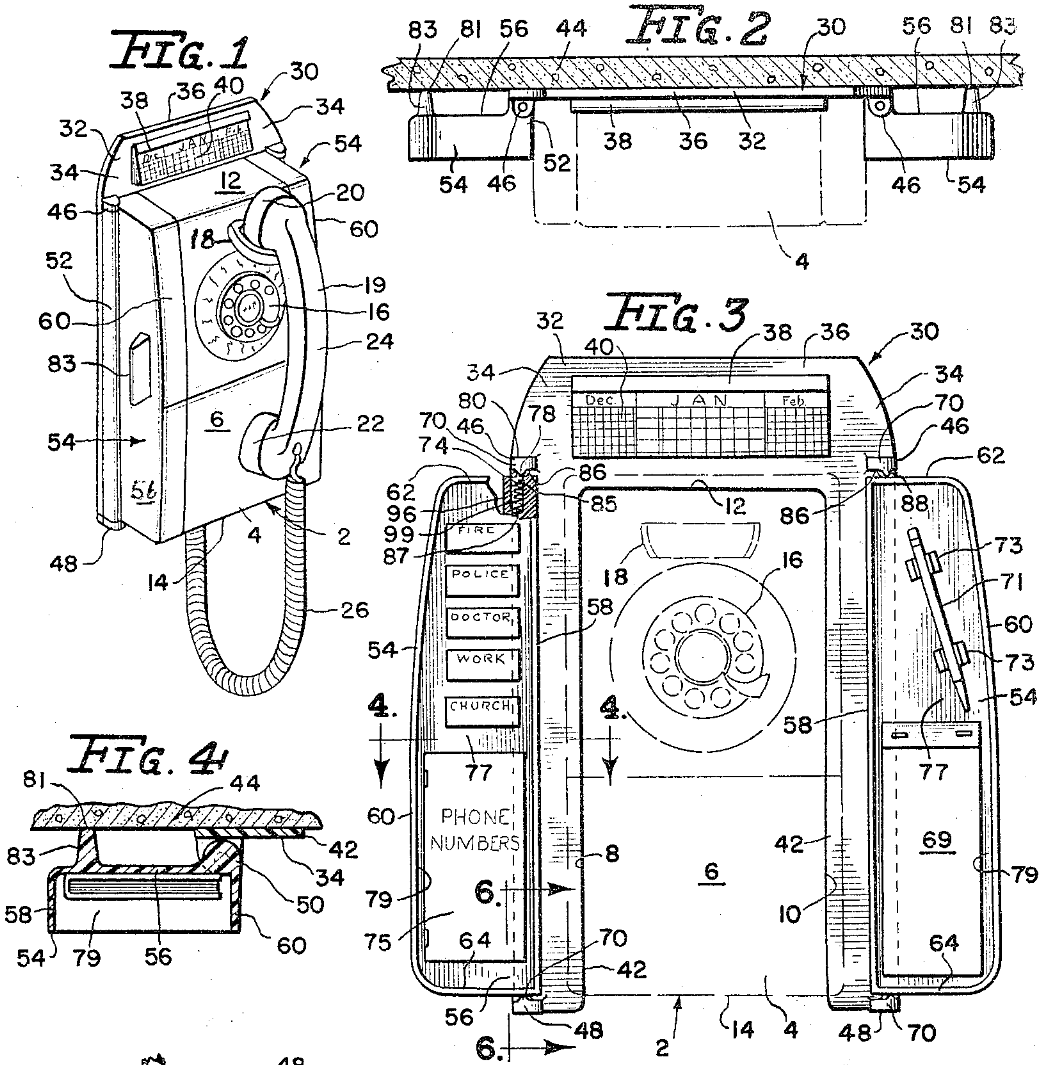
FIGURE 1 is a perspective view of a wall telephone with the novel holder device applied thereto.
FIGURE 2 is an enlarged top end view of the structure of FIGURE 1 in open position.
FIGURE 3 is a front view of the structure shown in FIGURE 2.
FIGURE 4 is an enlarged cross-sectional view taken substantially on line 4—4 of FIGURE 3.
Figures 6, 7:
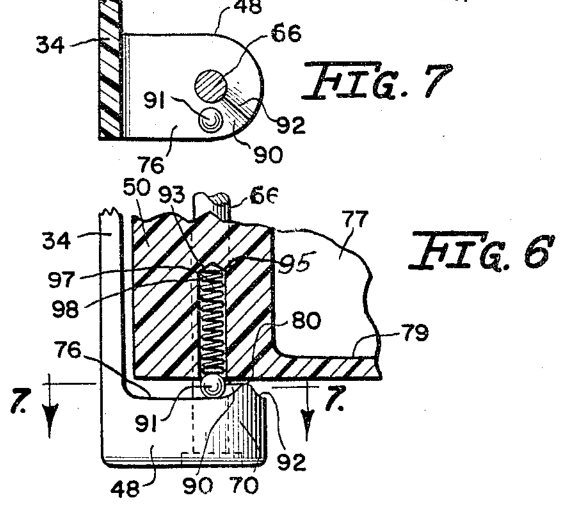
FIGURE 6 is an enlarged sectional view on line 6—6 of FIGURE 3.
FIGURE 7 is a sectional view on line 7—7 of FIGURE 6.
Figure 5:
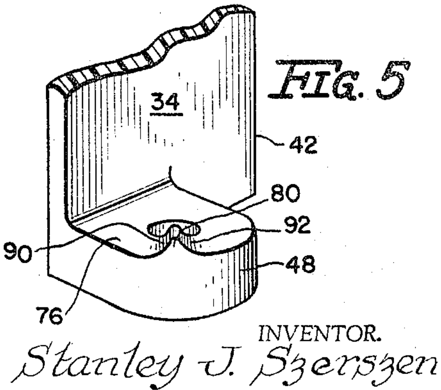
FIGURE 5 is an enlarged perspective view of one of the hinge portions.

Describing the invention in detail and having particular reference to the drawings, there is shown a wall telephone generally designated 2 which comprises a housing 4 having a convex front side 6 and vertical lateral sides 8 and 10 and top and bottom sides 12, 14.

As best seen in the perspective view (FIGURE 1) the sides bow forwardly intermediate the top and bottom sides 12, 14. A conventional dial 16 is on the forward side 6 as well as the hook 18 for the transducer 19 which includes a mouthpiece 22 and earpiece 20 which hangs on the switching hook 18. The cradle 24 is connected by wire 26 to the telephone circuitry.

The novel attachment structure 30 comprises an inverted U-shaped saddle 32 which is a flat plate structure having a pair of vertical side portions 34, 34 and an interconnecting upper bight portion 36 which may have a calendar holder 38 molded or attached thereto in any conventional manner for supporting a calendar 40.

Each side portion 34 has its inboard edge portion 42 fitted behind the adjacent side of the telephone body to secure the attachment in place against a wall 44 which also supports the telephone 2.

Each side portion 34 is provided with vertically spaced top and bottom hinge elements 46 and 48 which receive therebetween a hinge element 50 on the rear outer corner 52 of the related enclosure or door structure 54.

Each enclosure structure or housing 54 comprises an outer upright wall 56, front and rear walls 58 and 60 and upper and lower walls 62, 64. The walls 58, 60 and 62, 64 are arranged as lateral extensions of the respective portions of the telephone housing and present top, bottom and front surfaces coplanar with respective surfaces of the telephone box. The top and bottom lugs 46, 48 receive a pintle 66 which is preferably frictionally secured within the bead portion 50 to accommodate swinging movements of the respective enclosure 54 about a substantially vertical axis between a closed position shown in FIGURE 1 and an open position of FIGURES 2 and 3.

The enclosures or wings are biased into open or closed position by cam means 70, 70. The lower side 74 of the upper lug 46 and the upper side 76 of lug 48 are provided with cam lobes 78, 80 crest between ramps 86, 88 and 90, 92 sloping laterally circumferentially with respect to the vertical axis of swinging of the door structure.

The thick wall bead 50 is provided with upper and lower bores 96, 98 which admit springs 99, 97. Spring 97 seats at its upper end as at 95 against the closed end 93 of bore 98 and at its lower end engages a ball 91 which rides on the slopes 90, 92. Similarly bore 96 admits spring 99 which seats at its lower end against the closed end 87 of bore 96, the upper end of spring 89 supporting a ball 85 which rides on the slopes 86, 88.

It will be realized that while ball 91 engages ramp 92, ball 85 engages ramp 86 in closed position of the door. Upon the door being swung open by the user grasping handle 83 on the side wall 56 and urging the respective door away from the telephone enclosure, the balls 90, 85 ride over the lobes 78, 80 and then ride on the inclined ramps 88, 92 urging or biasing the door to open position. Handle 83 serves as a bumper against the support wall engaging the same as at 81, FIGURE 2.

The interior of each door is hollow and provides a cavity 79. Upon the interior side 77 of wall 56 there are provided as by stick-on labels various information as shown in FIGURE 3. The lower wider portion of the pocket 79 of one door may support a miniaturized telephone directory 75.

The right door as seen in FIGURE 3 may have a pair of clips 73, 73 fastened to interior 77 of wall 56 and support a writing instrument such as a pencil 71. The lower portion of the right door may support a pad of tear-off paper 69 which may be fastened to surface 77 as by releasable press-on adhesives or any other securement well known to those skilled in the art.

A novel, functional and effective enclosure and support for telephone accessories is provided, it being understood that the same may be secured to the wall 44 as by screws and the like.

I claim:

1. An accessory container for a telephone having a box mounted upon a wall, a support saddle mounted astride the box, a pair of hollow door structures flanking the box, means pivotally supporting the door structures from the support for swinging movement toward and away with respect to the box, the accessory means within the door structures, said door structures having open inner sides for access into the door structures, said inner sides being disposed against the respective side of the box for closing the same.

2. In a telephone accessory container for a telephone having a wall box mounted upon an associated support wall, a U-shaped saddle having an upper portion extending over the box and having a pair of dependent side portions at opposite sides of the box, each side portion having hinge means, a hollow door structure at each side of the box hinged to the respective hinge means for swinging movement from a closed position against the related side of the box to open position exposing the interior of the door, and accessory means carried within each door structure.

3. In an accessory container for a wall telephone having a wall box with vertical sides and a substantially horizontal top, a support disposed over the top and along the sides of the box, accessory-containing hollow door structures having open inner sides disposed in closed position against the respective sides of the box, means pivotally supporting the doors from said support for swinging movement about vertical axes between closed and open positions.

4. In an accessory container for a wall telephone, a U-shaped support saddle having an upper bight and depending legs defining a wall-box accommodating space therebetween, and hollow doors pivotally mounted from said legs for swinging movement between closed and open positions at opposite sides of an associate wall box.

5. In an accessory container for a wall telephone, a support structure having a wall telephone box accommodating slot for mounting about the box, a pair of opposed hollow accessory-containing doors mounted upon the support, means mounted on said doors from the support to swing toward each other to closed position against opposite sides of an intervening box, and to open position away from the box.

6. The invention according to claim 5 and means reactive between the support and said doors biasing the doors to closed and to open positions.

7. The invention according to claim 5 and said doors having handles positioned to abut the telephone box supporting wall to prevent overswinging of the doors and positioning the doors so that the interiors are accessible.

8. An accessory container for a wall telephone of the type having a box mounted upon a wall and having vertical sides, an attachment comprising an inverted U-shaped support panel having an upper portion adapted to extend over the box and having vertical portions adapted to extend along respective sides of the box, a hollow door structure pivotally mounted on each vertical portion for swinging toward and away with respect to the adjacent side of the box, each door structure having an open inner side adapted to be closed attendant to positioning of the door with said open side against the respective vertical side of the box, accessory means within each door structure, and spring-actuated cam means on each door structure and vertical portion biasing the door to closed position upon the door structure being swung to such closed position and biasing the door structure to open position upon the door structure being swung to open position.

9. In an accessory container for a wall telephone of the type having a vertically elongated wall box with vertical sides and a forwardly bowed front, an attachment comprising a support plate having portions at opposite sides of the box, a door structure at each side of the box having a vertical section complemental to the corresponding section of the box and forming lateral extensions thereof, and means swingably supporting the door structures for movement to open position away from the box and closed position against the box.

10. The invention according to claim 9 and hinge means on the support, and each door structure having an outer rear corner structure between the hinge means, pintle means connecting the hinge means with the rear corner structure, each hinge means having a cam lobe and a spring-pressed cam member.

References Cited by the Examiner

UNITED STATES PATENTS

| | | | |
|---|---|---|---|
| 2,611,477 | 9/1952 | Keys | 312—198 X |
| 3,166,288 | 1/1965 | Eisenberg | 248—441 |

CLAUDE A. LE ROY, *Primary Examiner.*

F. DOMOTOR, *Assistant Examiner.*